United States Patent
Laird et al.

[15] 3,671,022
[45] June 20, 1972

[54] METHOD AND APPARATUS FOR THE MICRODISPERSION OF OXYGEN IN WATER

[72] Inventors: William Burton Laird, Murray Hill; Roy L. Williams, Millington; Allen V. Muska, Berkeley Heights, all of N.J.

[73] Assignee: Air Reduction Company, Incorporated, New York, N.Y.

[22] Filed: Oct. 6, 1969

[21] Appl. No.: 863,870

[52] U.S. Cl..................................261/29, 261/93, 261/124, 210/220, 210/170
[51] Int. Cl. ..........................................B01f 3/04
[58] Field of Search....................210/220, 170, 219; 261/36, 261/29, 23, 77, 93, 87, 120, 123, 124

[56] References Cited

UNITED STATES PATENTS

| | | | |
|---|---|---|---|
| 1,143,162 | 6/1915 | Armstrong | 261/77 |
| 1,643,273 | 9/1927 | Imhoff | 210/170 |
| 1,867,824 | 7/1932 | Hammerly | 210/220 X |
| 3,123,652 | 3/1964 | Gross | 261/87 X |
| 3,271,304 | 9/1966 | Valdespino et al. | 210/220 X |
| 3,336,016 | 8/1967 | Schreiber | 210/220 X |
| 3,365,178 | 1/1968 | Bood | 261/121 X |
| 3,470,091 | 9/1969 | Budd et al. | 210/220 X |
| 3,489,396 | 1/1970 | D'Aragon | 210/220 X |
| 3,505,213 | 4/1970 | Anthony et al. | 210/170 X |
| 3,521,864 | 7/1970 | Welles, Jr. | 210/220 X |

FOREIGN PATENTS OR APPLICATIONS

| | | | |
|---|---|---|---|
| 703,863 | 2/1965 | Canada | 261/120 |
| 35,935 | 12/1885 | Germany | 210/220 |

*Primary Examiner*—Tim R. Miles
*Attorney*—Edmund W. Bopp and H. Hume Mathews

[57] ABSTRACT

Method and apparatus are disclosed for oxygenating river water or the like. According to the invention a localized flow of water is established beneath the surface of the river, e.g. by impelling water at the river bottom through a conduit. Simultaneously, small volumes of water are mixed with oxygen at pressures under the river, and are immediately injected into the localized flow whereby the minute oxygen bubbles therein are dispersed before substantial agglomeration of bubbles can occur.

17 Claims, 4 Drawing Figures

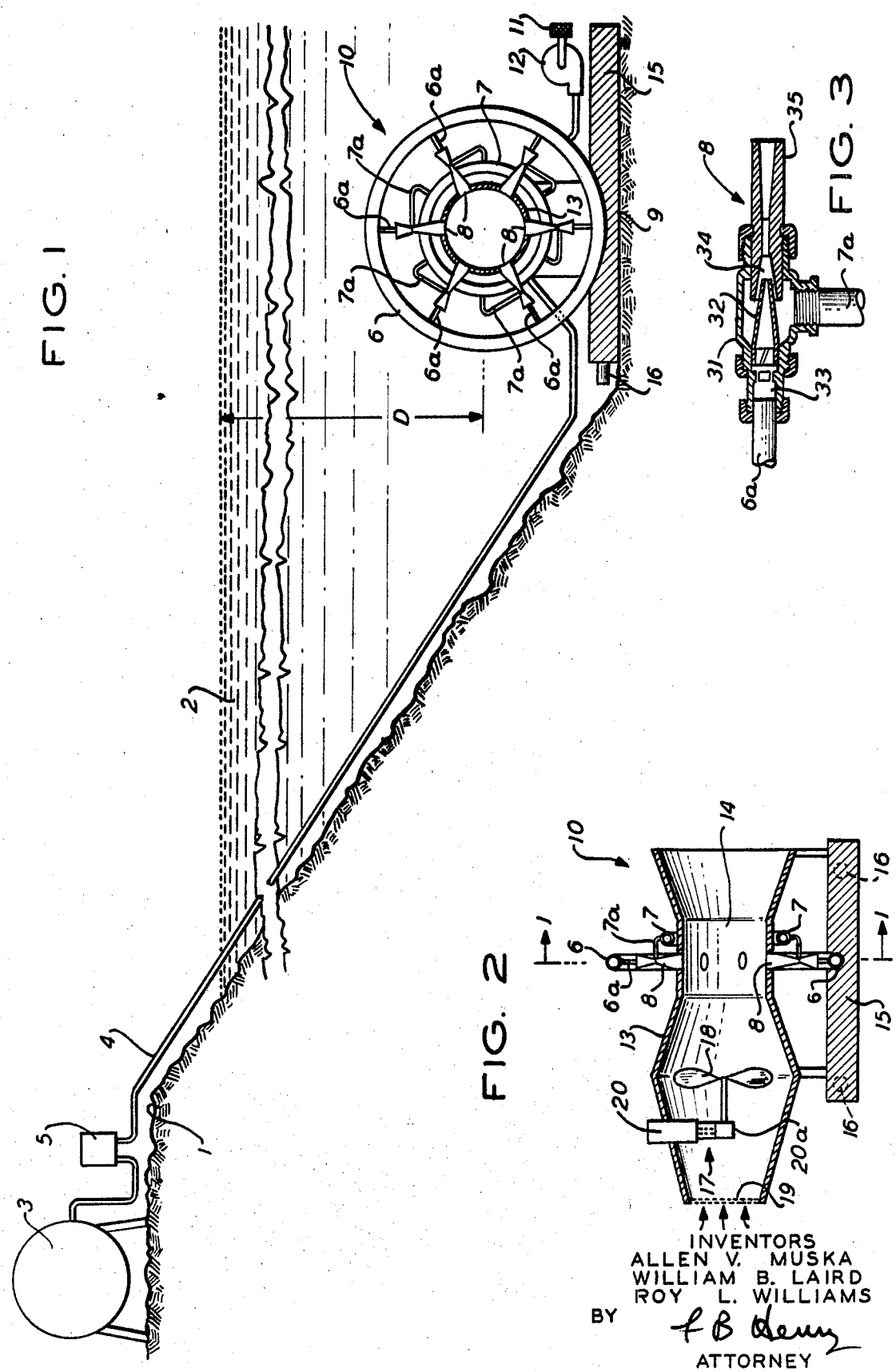

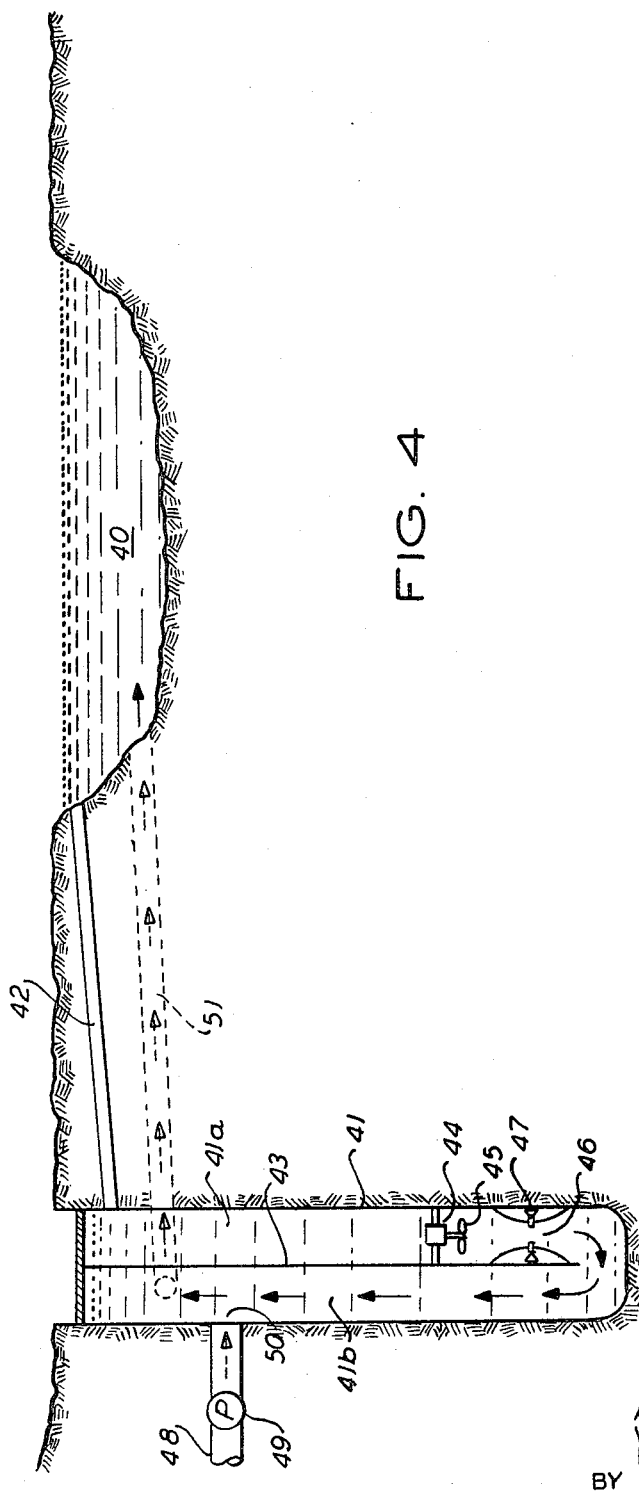

3,671,022

METHOD AND APPARATUS FOR THE MICRODISPERSION OF OXYGEN IN WATER

BACKGROUND OF THE INVENTION

1. Field of the Invention

This invention relates generally to water depollution, and more specifically relates to methodology and apparatus useful in oxygenating surface waters, such as rivers and streams.

2. Description of the Prior Art

The recent unprecedented growth in the population of our country, attended by an even more rapid growth of industrial activity, has generated a flow of waste water which up until the present time has not been susceptable of adequate purification treatment. This polluted water finds its way directly or indirectly into lakes and rivers, which in turn become polluted and threaten the health and welfare of millions of our people.

Steps are being taken to prevent pollution. But with the present rate of population and industrial growth, it is doubtful that efforts at removal or modification of polluting sources, can alone solve the problem. Accordingly much recent attention has centered on the alternative (or supplementary) approach of artificially accelerating the natural processes that— given sufficient time—purify a stream or river. In particular, increasing interest has centered upon technology suitable for increasing the supply of oxygen in polluted waters, whereby to enable oxidation of organic matter contained therein.

The simplest supplementary oxidation technique, and one that has been in use for years, involves surface aeration of the water, usually accomplished by spreading the water in some manner as to increase the air-water contact interface. While this technique is quite practical for treating relatively small volumes of water, it becomes increasingly impractical from a cost and engineering viewpoint as the size of the river or other body of water to be treated increases.

The best-known alternative to surface aeration, and an approach particularly suitable for treatment of flowing waters— such as rivers—involves injecting oxygen directly into the polluted waters. This has been carried out in the past by withdrawing a portion of the river flow to create a sidestream on the river bank at substantially the surface elevation of the river. This side-stream is made to pass through a pipe, a conduit whose walls are finely perforated is placed in the pipe so that oxygen at very high pressure seeps into the water. The side-stream, which is itself under very high pressure from a suitable pump, is then delivered to the river proper and diffused therein by a header. Another approach is to introduce oxygen into river water as it passes through the turbine blades in a hydro-electric plant.

The first technique for oxygen injection set forth in the preceding paragraph, while effective in comparison to surface aeration, is less than ideal in several respects. Firstly, it requires the use of high pressures both in the gaseous oxygen delivered at the oxygenator and in the water being moved through the oxygenator and into the river. Unless such high pressures are present adequate amounts of oxygen will not be added to water, or at any rate will be added at the oxygenator in such large bubble size that by the time the side-stream water reaches the header in the river a high proportion of the bubbles will have agglomerated thereby reducing the area of gasliquid interface. But the use of very high pressures not only involves expensive pumping equipment and the like, but moreover implies expensive operation in that more work is ultimately done on the water being oxygenated.

Secondly, it is found in spite of the use of high pressures as set forth above, that oxygen absorption efficiency in schemes of the type described, is undesirably low—somewhere around 55 percent. It is believed that the explanation for this result is somewhat as follows: a relatively long period is involved between the time sidestream water is oxygenated on the river bank and is joined with the main river flow. Accordingly even though the high pressures used initially add a good bit of finely dispersed oxygen to the side-stream water, there remains an undesirably long period during which agglomeration of minute bubbles may occur to form larger bubbles—which are then easily lost from the water.

OBJECTS OF THE INVENTION

In accordance with the foregoing, it may be regarded as an object of the present invention, to provide method and apparatus for efficiently oxygenating rivers and similar bodies of water.

It is a further object of the invention, to provide a method and apparatus for practice of the method, whereby efficient oxygenation of river water or the like is possible without the use of high pressure gas and/or high pressure water pumping equipment, whereby economies may be effected both in the cost of initial equipment and in the cost of equipment operation.

It is an additional object of the invention to provide oxygenating apparatus and methods, which enable introduction of large quantities of microdispersed oxygen into polluted river waters, and which furthermore prevent substantial agglomeration of the microdispersed oxygen into larger bubbles with attendant loss of oxygen.

SUMMARY OF THE INVENTION

Now in accordance with the present invention, the foregoing objects, and others as will become apparent in the course of the ensuing specification, are achieved by positioning at the bottom of the polluted river or other body of water, an open-ended conduit such as a pipe, which is provided with an impeller for driving reasonably large quantities of water per unit time therethrough. An auxiliary water supply system pulls in volumes of water per unit time which are small compared to the flow being impelled through the conduit. The outlet from this auxiliary system is at the said conduit, but means are present in the system for oxygenating the auxiliary water close to the point at which injection into the main flow of the conduit occurs. Oxygenating therefore takes place under the pressure conditions present at river bottom, an environment which eases the need for high pressure pumps; moreover, the comparatively small, oxygen-charged water volumes are immediately added to a high volume diluting flow, in consequence of which relatively little agglomeration of minute bubbles occurs.

In an alternative embodiment suitable for shallow bodies of polluted water, the oxygenation is performed in a deep well or shaft which is sunk adjacent to the body of water and which communicates with the body of water.

BRIEF DESCRIPTION OF THE DRAWINGS

The invention is diagrammatically illustrated, by way of example, in the appended drawings, in which:

FIG. 1 schematically depicts apparatus in accordance with the invention installed and operating in a representative river bed (not to scale), and illustrates the basic method of the invention;

FIG. 2 is a longitudinal cross-section through the oxygenating apparatus of FIG. 1;

FIG. 3 is a view, partly in cross-section of an injector which is utilized in the practice of the invention; and FIG. 4 schematically depicts the invention utilized to purify a shallow body of water.

DESCRIPTION OF PREFERRED EMBODIMENT:

In FIG. 1, the basic technique involved in practice of the invention is illustrated, and apparatus is shown suitable for use in oxygenating rivers or the like in accordance with the invention. In this schematic depiction a river profile is seen in cross-section, with oxygenating apparatus generally designated at 10 positioned at the bottom 9 of the river 2. The maximum depth of the river, which approximately corresponds to the depth of apparatus 10 beneath the river surface is indicated as D; in a typical environment where the present invention finds application, D is of the order of 30 feet whereby gauge pressures in the vicinity of apparatus 10 are of the order of 13 p.s.i.g. It is of course within the scope of the invention to oxygenate at various depths depending on the characteristics of the river, stream, lake, ocean or the like.

Apparatus 10, which will be further described in connection with FIG. 2, consists of the central open-ended conduit 13, which is encircled by an auxiliary water manifold 6 and an oxygen manifold 7. Manifolds 6 and 7, in turn, each connect, via tubes 6a and 7a respectively, to a series of six injectors 8, which elements are positioned about the periphery of conduit 13. The number of injectors may vary depending on the size of the apparatus, the pressures involved, etc.

In accordance with the invention the auxiliary water supply for manifold 6 is drawn by the pump 12 through inlet 11 which is provided with a filter for eliminating rocks, sediment or the like. Pump 12 is a relatively low speed pump; and water is fed into injectors 8 from manifold 7. In a typical installation pump 12 will deliver 500 gallons per minute. Pump 12 may also be positioned on the river bank for easy servicing and the inlet 11 would thus be located just beneath the surface of the river so that the filter can be periodically and easily cleaned. Oxygen is provided for manifold 7 via a line 4 from river bank 1. This line can be considered as being a direct link to pipe line oxygen, or as actually shown in the Figure can be connected to an oxygen tank 3 via the heat exchanger 5 which converts the liquid oxygen stored in tank 3 into gaseous form. In either event, oxygen flows through line 4 under pressure without the necessity for a high pressure gas pump.

Oxygen entering via tubes 7a and auxiliary water entering via tubes 6a are then mixed in injectors 8 to yield a highly oxygen-charged auxiliary water. The injectors 8 are relatively standard devices in the aerating art; generally water passing through these devices is provided with a whirling motion and passes within the body of the injector from a nozzle to a delivery jet in a gaseous atmosphere whereat entrainment of the gas occurs. Devices of this type are, for example, available from the Penberthy Division of Houdaille Industries, Inc., Prophetstown, Illinois under designations such as the Series 180 A. As shown in FIG. 3, the water enters the inlet 33 from the tube 6a and passes through the nozzle 32. Oxygen gas entering through tube 7a passes into body 31 and is then mixed with the water which has passed through the nozzle 32 in the flow space 34. The water streams which now contain entrained oxygen gas bubbles of extremely small size then exits the injector through outlet 35.

In accordance with the present invention the mixing of oxygen and auxiliary water in injectors 8 is under the pressure conditions present at the bottom of river 2. As is well-known, the amount of oxygen entrained when given volumes of gas and water are mixed, as well as the bubble size of the entrained oxygen, is among other things a function of the pressures under which such blending occurs. In the present instance high absorption of oxygen and minute bubble size is assured by the pressures produced by the river itself—and external high pressure pumps need not be utilized.

The overall operation of apparatus 10 is perhaps better seen in the transverse sectional view of FIG. 2. As seen therein, the conduit 13 consists essentially of an open-ended tubular member, mounted on a precast concrete base 15. (In other embodiments base and conduit can be cast as an integral concrete structure, and of course the conduit in cross-section need not be cylindrical). The base 15 is provided with a series of projections 16, which merely serve as a convenient means for attaching cables or the like for lowering the apparatus to the river bed. A thruster 17, essentially consisting of a power source (such as an electric motor 20) gear reduction drive 20a and an impeller 18 are positioned at the open end of conduit 13. Electric power for thruster 17, as well as for pump 12, is supplied by a water tight electric cable from the river bank. A grating 19 surrounds this same end of conduit 13 and prevents rocks and other debris from entering the conduit and damaging impeller 18.

The flow through conduit 13 is very large compared to the flow of auxiliary water: typically over 110,000 gallons per minute will flow through conduit 13, while as has been cited, only of the order of 500 gallons per minute of auxiliary water will flow (a ratio of 220:1). As can be seen in the Figure, conduit 13 includes a central portion 14 of considerably reduced cross-section; the reduced section is in effect a venturi and flow velocity through this section, is of course, considerably higher than velocities elsewhere in the conduit. This increase in the velocity produces greater shear velocities across the discharges of the injectors and thereby greatly facilitates the distribution of minute bubbles of oxygen in the water flowing through the conduit 13.

The operation of apparatus 10 should now be quite clear. In particular a localized, comparatively large flow of water is established at the river bottom by the thruster 18 impelling said flow through venturi 14. At the venturi portion 14 the series of injectors 8 are seen to be arranged to directly feed the heavily oxygenated auxiliary water into the main flow in the conduit. Thus it is seen that not only does oxygenation of auxiliary water take place at the high pressures of the river bottom, but moreover the comparatively small oxygenated volumes are immediately fed—upon oxygenation—into a relatively high velocity flow of comparatively much larger volumes of water. The net result of this sequence of events is that the minute bubbles formed in the auxiliary water by the action of injectors 8 do not have time to agglomerate into larger bubbles and escape the system, but rather are immediately dispersed into the large diluted flow of conduit 13. In consequence much higher efficiency of oxygen absorption is evidenced than has previously been achieved in the art.

It is interesting to note that with flow rates for auxiliary water of the order of 500 gallons per minute, and for the main conduit 13 of 110,000 gallons per minute, apparatus of the type depicted in the Figures is capable of effecting an increase in dissolved oxygen (DO) of some 2 ppm in a representative river flow of 1.125 million gallons per minute. These figures are based on the assumption of initial $DO=O$ for the polluted river, on an assumed delivery of 1,400 pounds of oxygen per hour into the injectors, and on a dissolution rate of 80 percent for the oxygen.

An alternative embodiment of the invention is shown in FIG. 4. The embodiment shown in FIG. 1 is as has been stated especially suited for rivers of considerable depth. The instant invention may however be used to oxygenate shallow bodies of water in the manner illustrated in FIG. 4. Where the depth of the river is insufficient to create the necessary pressure or pressure head, it has been found necessary to artificially establish a suitable head by sinking a shaft or well 41 to the desired depth. The river water 40 is allowed to communicate with the well through a channel 42 which fills the well. The well is partitioned by means of a baffle 43 which extends longitudinally down to near the bottom of the well. A thruster 44, comparable to thruster 17 (shown in FIG. 2) is positioned near the bottom of the well. The impeller 45, acts to force the water downwardly through venturi 46 which is surrounded by a series of injectors 47 which are fed with oxygen gas and an auxiliary water flow supply in the same manner as described above in connection with FIG. 3. Water passing through venturi 46 is therefore oxygenated in the same manner as has been discussed in connection with FIGS. 1–3. The downwardly directed oxygenated water in channel 41a then passes upwardly in channel 41b. In order to maintain the oxygen in solution as it passes upwardly to regions of lower pressure, additional water is pumped from the river through conduit 48 by pump 49 and enters the channel 41b through opening 50 where it mixes with the oxygenated water to dilute the oxygen content to a point where the oxygen will not separate from the water. The diluted water is then returned to the river through return conduit 51. The oxygenated water thus is dispersed throughout the polluted river water to increase the DO content. Thus the alternative embodiment also provides for oxygenating polluted water at high pressures in a manner comparable to that described in connection with the first embodiment. Neither embodiment requires the pumping of either the water or the oxygen to high pressures with its attendent high costs and complications.

While the present invention has been particularly described in terms of specific embodiments thereof, it will be clear in view of the present disclosure that numerous modifications and departures from the invention are now enabled, which variations will yet reside within the true scope of the present teaching. For example, while the present invention has been particularly described in connection with its use in rivers, the invention is equally appropriate for use in any oxygen-deficient body of water, whatsoever. Thus the invention may be effectively utilized in polluted lakes, ponds, reservoirs and similar bodies of water, and may be used as well in artificially created bodies of water. In addition artificial flows may be treated with the invention, including for example sewerage lines from municipal and other sources and industrial waste flows. Accordingly the instant invention should be broadly construed, and limited only by the scope and spirit of the claims now appended hereto.

We claim:

1. Oxygenation apparatus comprising conduit means submerged in a body of water, pump means therein moving water therethrough, at least one fluid injector spaced about and discharging fluid transversely into said conduit means, a submerged water pump supplying water to said at least one injector, and oxygen manifold means supplying oxygen to said at least one injector.

2. Apparatus according to claim 1 wherein a plurality of fluid injectors are spaced about said conduit means, said oxygen manifold means supplying oxygen to each of said injectors.

3. Apparatus according to claim 1 wherein said conduit means has a portion of restricted cross-section whereby liquid moving through said conduit means has an increased velocity through said restricted portion, said at least one fluid injector discharging fluid into said restricted portion.

4. Apparatus according to claim 1 wherein said pump means comprises an impeller positioned in said conduit means.

5. Apparatus according to claim 1 in which said conduit means is located in a substantially vertical well having baffle means for creating upward and downward flow in said well.

6. Apparatus according to claim 5 in which the said at least one fluid injector is positioned in the lower portion of said well.

7. Apparatus according to claim 1 further including oxygen supply means at a surface location remote from the conduit means, an oxygen supply line extending from the oxygen supply means to the oxygen manifold means.

8. Apparatus according to claim 1 wherein the body of water may be a lake, pond, reservoir, river, stream, waste flow or the like, whether naturally or artificially created.

9. A method for introducing oxygen into a body of water having an insufficient oxygen content comprising, submerging a conduit means in said body of water, pumping water through said conduit means, discharging fluid transversely into said conduit means utilizing at least one fluid injector spaced about said conduit means, supplying water to said at least one injector from a submerged water pump, supplying oxygen to said at least one injector from an oxygen manifold.

10. A method according to claim 9 wherein the body of water may be a lake, pond, reservoir, river, stream or the like whether naturally or artificially created.

11. A method according to claim 9 wherein said body of water comprises a waste stream or flow.

12. A method according to claim 9 including discharging fluid transversely into said conduit from a plurality of fluid injectors spaced about said conduit means in annular array.

13. A method according to claim 9 wherein the operations are conducted in a well adjacent to the water body and communicating therewith.

14. A method according to claim 9 including pumping water through a portion of the conduit means having a restricted cross section whereby the velocity of flow through said portion increases.

15. A method according to claim 14 wherein the fluid that is discharged transversely into the conduit means is injected into the restricted portion.

16. A method according to claim 9 further including maintaining a supply of oxygen at a location remote from said conduit means, directing a stream of oxygen gas under pressure to the oxygen manifold from the supply of oxygen.

17. A method according to claim 9 wherein said body of water is relatively shallow, further comprising withdrawing a portion of said water from said body and directing it into a well having a greater depth than said body, locating said conduit means in the lower portions of said well, discharging the fluid into said conduit means at a depth greater than the depth of said body of water, returning the water which has been treated in the conduit means to the said shallow body of water to raise the oxygen level thereof.

* * * * *